United States Patent
Xi et al.

(10) Patent No.: US 11,352,281 B2
(45) Date of Patent: *Jun. 7, 2022

(54) METHOD AND DEVICE FOR PREVENTING AND CONTROLLING POLLUTANTS IN THE REUSE OF RECLAIMED WATER IN AGRICULTURAL ACTIVITY AREAS WITH EXTREME WATER SHORTAGE

(71) Applicant: CHINESE RESEARCH ACADEMY OF ENVIRONMENTAL SCIENCES, Beijing (CN)

(72) Inventors: Beidou Xi, Beijing (CN); Lei Wang, Beijing (CN); Yalei Zhang, Beijing (CN); Jinsheng Wang, Beijing (CN); Yali Zhang, Beijing (CN); Wenbing Tan, Beijing (CN); Tongtong Li, Beijing (CN); Yangyang Wang, Beijing (CN); Hui Liu, Beijing (CN); Feng Wu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 199 days.

This patent is subject to a terminal disclaimer.

(21) Appl. No.: 16/770,837

(22) PCT Filed: Dec. 12, 2018

(86) PCT No.: PCT/CN2018/120546
§ 371 (c)(1),
(2) Date: Jun. 8, 2020

(87) PCT Pub. No.: WO2019/114747
PCT Pub. Date: Jun. 20, 2019

(65) Prior Publication Data
US 2021/0188677 A1 Jun. 24, 2021

(30) Foreign Application Priority Data

Dec. 13, 2017 (CN) .......................... 201711332313.7

(51) Int. Cl.
*C02F 9/00* (2006.01)
*C02F 1/28* (2006.01)
(Continued)

(52) U.S. Cl.
CPC ................ *C02F 9/00* (2013.01); *C02F 1/281* (2013.01); *C02F 1/283* (2013.01); *C02F 1/288* (2013.01);
(Continued)

(58) Field of Classification Search
CPC .......... C02F 3/327; C02F 3/046; C02F 3/302; C02F 2103/06; C02F 3/10; C02F 3/286;
(Continued)

(56) References Cited

U.S. PATENT DOCUMENTS 6,811,700 B2 * 11/2004 Austin .................... C02F 3/327
210/194

FOREIGN PATENT DOCUMENTS

CN  201873573 U  *  6/2011
CN  104944679 A  *  9/2015
CN  106336091 A  *  1/2017

OTHER PUBLICATIONS

Chen, CN104944679 English machine translation, pp. 1-9 (Year: 2017).*
(Continued)

*Primary Examiner* — Claire A Norris
(74) *Attorney, Agent, or Firm* — CBM Patent Consulting, LLC

(57) ABSTRACT

Disclosed a device for preventing and controlling pollutants in the reuse of reclaimed water in agricultural activity areas
(Continued)

with extreme water shortage, including A²/O tank (1), nano-aeration tank (2) and quick soil infiltration device (3) connected in sequence. A²/O tank (1) is fed with wastewater to be treated, which is treated sequentially in anaerobic, anoxic and aerobic environment, thereafter the supernatant is transported into nano-aeration tank (2). The supernatant treated by nano-aeration tank (2) is transported into quick soil infiltration device (3), and is allowed to flow through one or more layers of fillers laid in quick soil infiltration device (3) to degrade or remove pollutants.

8 Claims, 1 Drawing Sheet

(51) Int. Cl.
| | | |
|---|---|---|
| *C02F 3/10* | (2006.01) | |
| *C02F 3/26* | (2006.01) | |
| *C02F 3/28* | (2006.01) | |
| *C02F 3/30* | (2006.01) | |
| *C02F 3/32* | (2006.01) | |
| *C02F 3/34* | (2006.01) | |
| *C02F 101/10* | (2006.01) | |
| *C02F 101/16* | (2006.01) | |
| *C02F 101/20* | (2006.01) | |
| *C02F 101/30* | (2006.01) | |

(52) U.S. Cl.
CPC .............. *C02F 3/102* (2013.01); *C02F 3/108* (2013.01); *C02F 3/26* (2013.01); *C02F 3/2806* (2013.01); *C02F 3/308* (2013.01); *C02F 3/322* (2013.01); *C02F 3/327* (2013.01); *C02F 3/341* (2013.01); *C02F 2101/105* (2013.01); *C02F 2101/16* (2013.01); *C02F 2101/20* (2013.01); *C02F 2101/30* (2013.01); *C02F 2203/006* (2013.01); *C02F 2305/023* (2013.01)

(58) Field of Classification Search
CPC ...... C02F 3/2806; C02F 3/2826; C02F 3/306; C02F 3/32; C02F 3/34; C02F 1/42; C02F 2003/001; C02F 3/301; C02F 9/00
USPC .......... 210/602, 617, 170.08, 605, 290, 630, 210/170.01
See application file for complete search history.

(56) References Cited

OTHER PUBLICATIONS

Li et al, CN 201873573 English machine translation, pp. 1-9 (Year: 2011).*

Wu et al, CN106336091 English machine translation, pp. 1-15 (Year: 2017).*

* cited by examiner

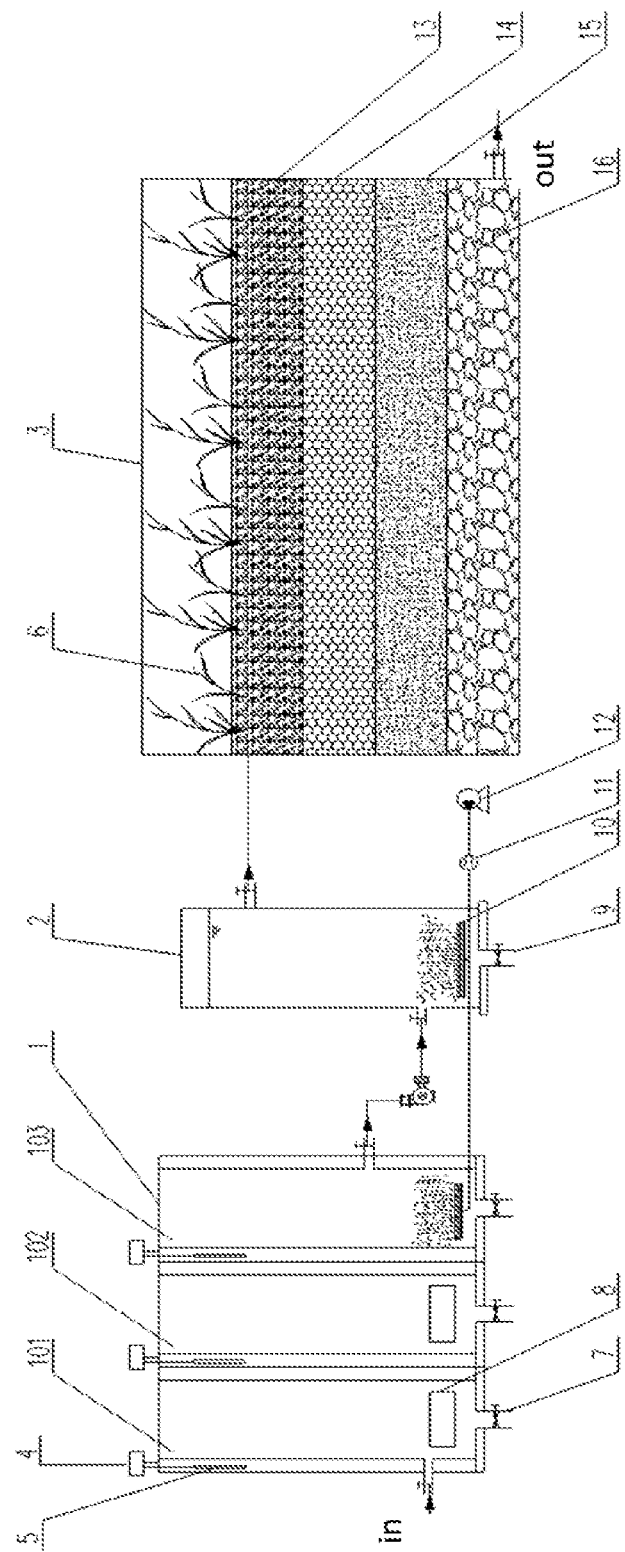

METHOD AND DEVICE FOR PREVENTING AND CONTROLLING POLLUTANTS IN THE REUSE OF RECLAIMED WATER IN AGRICULTURAL ACTIVITY AREAS WITH EXTREME WATER SHORTAGE

TECHNICAL FIELD

The invention belongs to the field of the reuse of reclaimed water, and particularly relates to a method and a device for preventing and controlling pollutants in the reuse of reclaimed water in agricultural activity areas with extreme water shortage.

BACKGROUND ART

Agricultural land is the supplier and regulator of the materials needed for the normal growth of crops. The yield of crops is directly affected by the quality of the land. With the economic development, the demand for water and soil resources in agricultural activity areas is increasing, whileas the constraint of water resources has become a bottleneck factor for economic development. In 2003, agricultural irrigation water accounted for 64.5% of the country's total water consumption, so the shortage of water resources is particularly prominent in agricultural production. According to Liu Changming's investigation, it is found that ground subsidence is occurred in Beijing due to excessive groundwater collection.

However, if sewage is used for irrigation, the content of heavy metals in soil will increase, and soil compaction, even soil pollution, will be caused. Investigation results in some areas of Taiyuan City and the irrigation area in the Guanzhong intersection show that heavy metal pollution in shallow groundwater will be caused by sewage irrigation. The large-scale survey and research on more than 1,000 samples of soil and vegetables in Beijing shows that different levels of heavy metal pollution exist in soil and vegetables of Beijing.

The reuse of reclaimed water is an important way to solve the crisis of water resources and a fundamental way to coordinate water resources and water environment. The reuse of domestic sewage can reduce the exploitation of groundwater and bring certain economic benefits. Reclaimed water refers to non-potable water that can be miscellaneously used in daily life, municipal administration, environment, and so on after various drainage have been treated to meet the prescribed water quality standards. Because its water quality index is lower than the water quality standard of domestic drinking water, but higher than the water quality standard of the sewage that is allowed to be discharged, which is in between, it is called "reclaimed water". The quantity of domestic sewage is huge and stable, and is not restricted by climatic conditions and other natural conditions. After the domestic sewage is treated to meet the water quality standard of farmland irrigation, it can be used steadily for irrigation in agricultural activity areas, thereby effectively alleviating the shortage of water resources.

With the development of cities, the population is increasing rapidly. If the reuse of reclaimed water is not performed, the problem of water shortage in agricultural activity areas including cities will be more prominent. Therefore, it is of great practical significance to carry out the reuse of reclaimed water in water-scarce or extremely water-scarce areas, and it is necessary to develop an effective treatment method or device for treating wastewater as reclaimed water that meets water quality standards of farmland irrigation to achieve effective utilization of wastewater.

Based on the above, it is necessary to develop a method and a device for preventing and controlling pollutants in the reuse of reclaimed water in agricultural activity areas with extreme water shortage, which can treat wastewater in the agricultural activity areas, or wastewater entering the agricultural activity areas as reclaimed water that meets irrigation requirements to prevent and control the content of pollutants such as heavy metals, thereby fundamentally reducing heavy metals and other pollutants in the crop, promoting the growth of the crop, avoiding the accumulation of heavy metals which endangering human health, maintaining good condition of the farmland, promoting sustainable and healthy development of the agriculture and ensuring agricultural safety and human safety.

CONTENTS OF THE INVENTION

In order to solve the above problems, the present inventors have conducted intensive studies, and provide a device for preventing and controlling pollutants, which including an $A^2/O$ tank, a nano-aeration tank and a quick soil infiltration device. The pollutants (including nitrogen, phosphorus, organic matters, heavy metals, and so on) in wastewater are adsorbed or removed through the synergistic physical, chemical and biological effects of plants, microorganisms and solid substrates in the device, thereby the wastewater is purified into reclaimed water that meets irrigation requirements, and thereby completing the present invention.

The object of the present invention is to provide the following technical solutions:

(1) A device for preventing and controlling pollutants in the reuse of reclaimed water in agricultural activity areas with extreme water shortage, wherein the device includes an $A^2/O$ tank 1, a nano-aeration tank 2 and a quick soil infiltration device 3 connected in sequence;

the $A^2/O$ tank 1 is fed with wastewater to be treated, and the wastewater is treated sequentially in an anaerobic tank 101, an anoxic tank 102 and an aerobic tank 103, thereafter the supernatant of the wastewater treated by the aerobic tank 103 is transported into the nano-aeration tank 2;

in the nano-aeration tank 2, the supernatant from the $A^2/O$ tank 1 is treated in aerobic environment, and the treated supernatant is transported to the quick soil infiltration device 3;

one or more layers of fillers are laid in the quick soil infiltration device 3, so that the supernatant is allowed to flow through each layer of the fillers to degrade or remove pollutants.

(2) A method for preventing and controlling pollutants in the reuse of reclaimed water in agricultural activity areas with extreme water shortage, by using the device according to (1), wherein the method includes: providing the $A^2/O$ tank 1, the nano-aeration tank 2 and the quick soil infiltration device 3 connected in sequence;

feeding wastewater to be treated into the $A^2/O$ tank 1, sequentially treating the wastewater in anaerobic, anoxic and aerobic environment, and then transporting the supernatant of the treated wastewater into the nano-aeration tank 2;

treating the supernatant from the $A^2/O$ tank 1 in aerobic environment in the nano-aeration tank 2, and transporting the treated supernatant to the quick soil infiltration device 3;

feeding the supernatant of the wastewater treated by the nano-aeration tank 2 into the quick soil infiltration device 3, and also into one or more layers of fillers laid in the quick soil infiltration device 3 to degrade or remove pollutants.

According to the present invention, the method and the device for preventing and controlling pollutants in the reuse of reclaimed water in agricultural activity areas with extreme water shortage have the following beneficial effects:

(1) In the present invention, the $A^2/O$ tank includes the anaerobic tank, the anoxic tank and the aerobic tank connected in sequence. Wastewater is treated by microorganisms in anaerobic-anoxic-aerobic environment, thereby the content of organic matters, nitrogen and phosphorus in wastewater can be reduced to a large extent.

(2) Nano-bubble water is fed into the nano-aeration tank, which can generate oxygen radicals to degrade organic matters with long carbon chain. Moreover, the nano-aeration tank is filled with carbon fiber ecological grass. Compared with the nano-aeration tank, the effects of organic matter degradation, denitrification, suspended matter removal and heavy metal removal are significantly enhanced by the combination of nano-aeration tank and carbon fiber ecological grass.

(3) The quick soil infiltration device in the present invention is constructed by laying multiple layers of fillers, and the types of fillers, dosage ratio, particle size and filling height of filler in each layer are specifically selected, so that heavy metal adsorption, suspended matter filtration, organic matter degradation, dephosphorization and denitrification, can be effectively realized in the quick soil infiltration device.

(4) In the present invention, specific wetland plants are planted in the quick soil infiltration device, which is beneficial to the enrichment of heavy metals, and the obtained aquatic plants enriched with heavy metals can be reused to prepare functional biochar with photocatalytic effect.

(5) In the present invention, the device for preventing and controlling pollutants is provided, which includes the $A^2/O$ tank, the nano-aeration tank and the quick soil infiltration device. The pollutants (including nitrogen, phosphorus, organic matters, heavy metals, and so on) in wastewater are reduced or removed through the synergistic physical, chemical and biological effects of plants, microorganisms and solid substrates in the device, thereby the wastewater is purified into reclaimed water that meets irrigation requirements, and thereby effectively achieving the problems of water shortage and groundwater over-exploitation.

DESCRIPTION OF FIGURES

FIG. 1 shows a schematic diagram of the device for preventing and controlling pollutants in the reuse of reclaimed water in agricultural activity areas with extreme water shortage according to a preferred embodiment of the present invention.

DESCRIPTION OF THE REFERENCE SIGNS

1—$A^2/O$ tank;
101—anaerobic tank
102—anoxic tank
103—aerobic tank
2—nano-aeration tank;
3—quick soil infiltration device;
4—temperature control device;
5—temperature probe
6—wetland plant
7—sludge discharge hole
8—agitator
9—secondary sludge discharge hole
10—aeration disk
11—flowmeter
12—nano-aerator
13—first layer of filler
14—second layer of filler
15—third layer of filler
16—fourth layer of filler

SPECIFIC EMBODIMENTS FOR CARRYING OUT THE INVENTION

The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the FIGURES, unless specifically noted, the figures are not necessarily drawn to scale.

As shown in FIG. 1, the inventors conducted a lot of research, and provided a device for preventing and controlling pollutants in the reuse of reclaimed water in agricultural activity areas with extreme water shortage, thereby effectively controlling the contents of pollutants, such as suspended matters, heavy metals, total nitrogen and total phosphorus in water fed into the farmland. The device includes $A^2/O$ tank 1, nano-aeration tank 2 and quick soil infiltration device 3 connected in sequence.

Wastewater to be treated is fed into the $A^2/O$ tank 1, and then is treated sequentially in anaerobic, anoxic and aerobic environment, thereafter the supernatant of treated wastewater (the supernatant after treatment in the aerobic environment) is transported into the nano-aeration tank 2.

The supernatant from the $A^2/O$ tank 1 is treated in aerobic environment in the nano-aeration tank 2, such as organic matter degradation, suspended matter sedimentation, dephosphorization and denitrification, and then the treated supernatant is transported to the quick soil infiltration device 3.

One or more layers of fillers are laid in the quick soil infiltration device 3, so that the supernatant or the received wastewater is allowed to flow through each layer of the fillers to degrade or remove pollutants, such as organic matter degradation, heavy metal fixation and removal, suspended matter filtration, denitrification and dephosphorization.

In the present invention, the $A^2/O$ tank 1 includes the anaerobic tank 101, the anoxic tank 102 and the aerobic tank 103 connected in sequence. Wastewater is fed into the anaerobic tank 101, and the easily degradable organic matter in wastewater is converted into volatile fatty acids (VFAs) by facultative anaerobic bacteria. Moreover, phosphorus-accumulating bacteria is added to the anaerobic tank 101 to decompose phosphorus in the body in the anaerobic tank 101, and then a part of the released energy is provided for aerobic phosphorus-accumulating bacteria to survive in the anaerobic environment, and another part is provided for the phosphorus-accumulating bacteria to actively absorb VFAs and store poly-β-hydroxybutyric acid (PHB) in the body. Wastewater is then fed into the anoxic tank 102, and denitrifying bacteria is added to the anoxic tank 102 to use organic matters and nitrate for denitrification. Thereafter, wastewater is fed into the aerobic tank 103, and the easily degradable organic matters remained in wastewater is absorbed and utilized by the phosphorus-accumulating bacteria. In addition, the PHB stored in the body is decomposed by the phosphorus-accumulating bacteria to generate energy for self-reproduction, and the dissolved phosphorus in the environment is actively absorbed by the phosphorus-accumulating bacteria and stored in the body in the form of phosphorus. Moreover, nitrobacteria (nitrite bacteria and nitrate bacteria) are added in the aerobic tank 103, and ammonia nitrogen is oxidized to nitrite and nitrate, which increases the nitrogen nutrition available to plants and is beneficial to denitrify through subsequent denitrification. After organic matters, nitrogen and phosphorus in wastewater are utilized by phosphorus-accumulating bacteria and denitrifying bacteria in the anaerobic tank 101 and the anoxic tank 102, concentrations of which are effectively reduced.

In a preferred embodiment, the temperature in the $A^2/O$ tank 1 can be adjusted by a temperature control system, preferably the temperature in the $A^2/O$ tank 1 is measured by a temperature probe 5 of a temperature control device 4 in the temperature control system. The measured temperature is compared with the set temperature to adjust the temperature in the $A^2/O$ tank 1 to the set temperature.

In a preferred embodiment, aquatic plants, such as duckweed and algae, are added to the anaerobic tank 101 of the $A^2/O$ tank 1, and are acidified and digested in the anaerobic and anoxic environment in the $A^2/O$ tank 1, and then organic matters are degraded in the aerobic environment. By evaluating the effect of the device of the present invention on pollution removal, an appropriate amount of aquatic plants is added to the $A^2/O$ tank 1 under the premise of meeting the standards of organic matter in irrigation water (Chemical oxygen demand $(COD_{Cr})\leq 150$-$300$). Aquatic plants are acidified and degraded in the $A^2/O$ tank 1 to provide microorganisms in the quick soil infiltration device 3 with a carbon source for reproduction, which is conducive to the removal of nitrogen, phosphorus and organic matters with long carbon chains in wastewater.

In the present invention, a sludge discharge hole 7 is set at the bottom of the $A^2/O$ tank 1, preferably the bottoms of the anaerobic tank 101, the anoxic tank 102 and the aerobic tank 103 of the $A^2/O$ tank 1 are all equipped with sludge discharge holes 7. The source of wastewater is complex, and if duckweed and algae are used as raw materials for nutrients of bacterial growth, there must be sludge or sediment in wastewater. The setting of the sludge discharge hole 7 facilitates the discharge of the sludge or sediment and reduces the invalid occupation of the space in the $A^2/O$ tank 1.

In a preferred embodiment, if duckweed and algae are used as raw materials for nutrients of bacterial growth to acidify and degrade in the $A^2/O$ tank 1, the anaerobic tank 101 and the anoxic tank 102 of the $A^2/O$ tank 1 are equipped with agitators 8, so that duckweed and algae can be crushed to speed up the acidification and digestion process.

Preferably, when the COD of the supernatant (fed into nano-aeration tank 2) in the $A^2/O$ tank is higher than 200 mg/L, it is considered that the degree of decomposition of duckweed and algae in the $A^2/O$ tank 1 is good.

In the present invention, aeration disk(s) 10 is(are) set at the lower parts of the aerobic tank 103 of the $A^2/O$ tank 1 and the nano-aeration tank 2, and an oxygen-containing fluid is introduced through the aeration disk 10 into the aerobic tank 103 and the nano-aeration tank 2. Furthermore, the oxygen-containing fluid is nano-bubble water or the aqueous solution containing tiny bubbles with a size of 100-500 nm, and dissolved oxygen amount of 10-25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise, due to a self-pressurizing effect of the internal gas of nano-bubbles because of the surface tension). Active oxygen radicals, such as hydroxyl radicals are generated after the bubbles collapse, thereby efficiently degrading long carbon chain organic matters in water; and the high temperature generated at the moment of collapse is also conducive to the degradation of long carbon chain organic matters.

In a preferred embodiment, the diameter of the pores on the aeration disk 10 is a nano-aperture, and it can be set to further ensure the bubble entering the nano-aeration tank 2 to be nano-sized bubbles. The aeration disk 10 is connected to a flowmeter 11 and a nano-aerator 12 in sequence through a pipeline. The oxygen-containing fluid is supplied through the nano-aerator 12 to the aeration disk 10, and the flow rate (or the amount of oxygen) of the oxygen-containing fluid feeding into the nano-aeration tank 2 can be effectively controlled by the flowmeter 11.

In a preferred embodiment, a secondary sludge discharge hole 9 is set at the bottom of the nano-aeration tank 2 to further remove the sludge or sediment brought by wastewater, to avoid blocking the pipeline when transporting to the quick soil infiltration device 3, or to avoid blocking the pore of the filler in the quick soil infiltration device 3.

In a preferred embodiment, organic matters with long carbon chains can be effectively degraded in the nano-aeration tank 2, so that the average molecular weight of organic matters in water from the nano-aeration tank 2 is lower than 308.24 Da, and preferably lower than 254.50 Da.

In a preferred embodiment, microorganisms are added in the nano-aeration tank 2, and said microorganism is *Bacillus* sp., which belongs to the genus *bacillus*. Organic matters with long carbon chains are used as the carbon source by the bacteria of *Bacillus* sp., such as *Bacillus* sp. LY, *Bacillus* sp. H2 or *Bacillus* sp. JB4, for growth, so the addition of *Bacillus* sp. can promote the degradation of organic matters with long carbon chains.

Meanwhile, *Bacillus* sp. LY is heterotrophic nitrifying bacteria with denitrification function, *Bacillus* sp. H2 is aerobic denitrifying bacteria, and *Bacillus* sp. JB4 is heterotrophic nitrifying-aerobic denitrifying bacteria. Therefore, when one or more of the above bacteria are used to degrade hydrocarbon organic matters with long chains in the nano-aeration tank 2, oxygen, nitrite or nitrate can also be used as an electron acceptor for denitrification. The above bacteria are fed with the wastewater after degradation into the quick soil infiltration device 3, where the wastewater can be further denitrified.

In the present invention, the nano-aeration tank 2 is filled with carbon fiber ecological grass. Compared with the nano-aeration tank 2, the effects of organic matter degradation, denitrification, suspended matter removal and heavy metal removal are significantly enhanced by the combination of nano-aeration tank 2 and carbon fiber ecological grass:

(a) Carbon fiber ecological grass is PAN fiber made of acrylic long fibers with extremely high adsorption and biological affinity. An adhesive active biofilm is formed by the microbial flora on the surface of carbon fiber ecological grass, which is combined with oxygen-containing fluids to degrade and transform organic pollutants in water through the adsorption of organic pollutants, biological oxidation and other links. (b) Three reaction zones of aerobic, facultative anaerobic and anaerobic are formed from the outside and inside on section of biofilm formed on the surface of the carbon fiber ecological grass, thereby creating suitable conditions for the reproduction of bacterial communities with nitrification and denitrification and finally achieving the purpose of reducing total nitrogen. (c) Wastewater, especially domestic sewage, contains a large amount of suspended matters that can cause farmland compaction. The inorganic components of large particles can be removed by the aeration and sedimentation of the nano-aeration tank 2. Moreover, the tree structure is dispersed underwater by the carbon fiber ecological grass, which increases the contact between the particles and biofilm, thereby suspended solids of small particles that are not removed by aeration and sedimentation are fully settled during this contact process. (d) Carbon fiber ecological grass has a strong adsorption and enrichment effect on minerals and heavy metals: on the one hand, a large number of microorganisms are attached to the surface of the carbon fiber ecological grass to continuously absorb and enrich heavy metals during the full contact with pollutants; on the other hand, a large amount of biological flocculant is produced by biofilm on the surface of ecological grass to fully flocculates heavy metals.

In the present invention, the quick soil infiltration device 3 is provided with three to six layers of fillers from top to bottom, and the filler of each layer may be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment, the quick soil infiltration device 3 is provided with four layers of fillers from top to bottom:

the first layer of filler 13 adsorbs heavy metals and degrades organic matters;

the second layer of filler 14 adsorbs and fixes heavy metals;

the third layer of filler 15 adsorbs heavy metals, and phosphorus-accumulating bacteria is added in this area to reduce the phosphorus content of wastewater to be purified because of the phosphorus-accumulating ability;

the fourth layer of filler 16 adsorbs heavy metals, and phosphorus-accumulating bacteria is allowed to dephosphorize in this area by constructing an anaerobic environment, so its phosphorus-accumulation ability in the third layer of filler 15 is promoted. An anaerobic denitrifying bacteria is added to reduce the nitrogen content of wastewater to be purified.

In a preferred embodiment of the present invention, the first layer of filler 13 is laid at 0-500 cm, and the first layer of filler 13 is a mixed filler of soil and functional biochar, and the mixing ratio is 3:(6-8), and preferably 3:7.

Wherein, biochar is a material with high carbon content obtained from biomass after high temperature treating and deoiling under anoxic conditions. Functional biochar is biochar loaded with transition metals.

Functional biochar has the following characteristics of biochar:

(1) In term of microstructure, it has characteristics of porosity, and biochar has a controlled porosity compared to other materials, namely micropores (<0.9 nm), small pores (<2 nm) and large pores (>50 nm). The large pores can ensure the aeration and water retention capacity of the soil used with it, and also provide a place for microorganisms to survive and reproduce, thereby improving the activity and reproduction rate of the microorganisms; micropores and small pores affect the adsorption and transfer of molecules by biochar, and the pore structure of biochar can reduce the rate of water penetration and enhance the adsorption capacity of soil for nutrients that are highly mobile and easily leached; therefore, its porous structure is conducive to the growth of plants on the first layer of filler.

(2) The porosity of biochar determines its large surface area, and a large amount of organic matters in the regional water can be adsorbed, which is conducive to the degradation of organic matters after adsorption.

(3) The surface of the biochar has carboxyl, phenolic hydroxyl, and carbonyl oxygen-containing functional groups. The biochar has higher cation exchange capacity because of negative surface charges generated by the above functional groups, and thus can effectively adsorb heavy metal ions in wastewater.

It is worth noting that, in addition to the above-mentioned characteristics of biochar, functional biochar is loaded with transition metals (such as nickel, cobalt and iron), therefore water molecules or hydroxides adsorbed on the surface of functional biochar are oxidized in the presence of oxygen through the photocatalysis of transition metals to generate active oxygen such as hydroxyl radical (.OH), and thus organic pollutants are degraded, desulfurized (S), and dechlorinated (Cl), thereby reducing their toxicity and odor.

In the present invention, the first layer of filler 13 is mainly composed of functional biochar, and the soil is added as an auxiliary, which is beneficial to the planting of the plants on the first layer of filler 13. After experiments, it was found that when the soil and the functional biochar were mixed with a weight ratio of 3:(6-8), good growth of plants could be achieved due to the fixation of the activated carbon to the soil, and a large amount of organic matters can be absorbed by the filler with the functional biochar as main part, then be effectively degraded through the photocatalysis of transition metal ions. If the weight ratio of soil to functional biochar is less than 3:8, namely the ratio of soil decreases, plants grow slowly due to lack of necessary nutrients. If the weight ratio of soil to functional biochar is more than 3:6, the photocatalytic effect is reduced, so the degradation efficiency of organic matters decreases.

In a further preferred embodiment, the particle size of the filler in the first layer of filler 13, especially of the functional biochar, is 0.10-0.30 cm. Within this particle size range, the support of functional biochar to the soil is beneficial for air to enter the filler layer, and the plant roots are effectively contacted with air, which is beneficial to the growth of aquatic plants planted on the first layer of filler 13. The functional biochar located in the lower part of the water body undergoes photocatalytic reaction in the presence of oxygen to achieve effective degradation. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not conducive to photocatalytic efficiency due to the smaller surface area.

In a further preferred embodiment, wetland plants 6, preferably barracuda and canna, are planted on the first layer of filler 13. Barracuda and canna can grow normally in eutrophic water bodies, showing good water purification effects. The values of total nitrogen, total phosphorus, and chemical oxygen demand (COD) in water can be effectively reduced through plant absorption, volatilization, root filtration, degradation, stabilization, and so on. Barracuda and canna show extremely high enrichment capacity for heavy metals, and the accumulation of heavy metals in the two plants is more than 100 times that of ordinary aquatic plants, while their normal growth is not affected. Heavy metals can be completely removed from the water body by harvesting plants. Therefore, these two wetland plants are selected for planting, which is an effective ecological method for reducing heavy metals.

In a further preferred embodiment, functional biochar can be obtained by carbonizing, activating, deoiling, reducing and drying the wetland plants 6 (barracuda and canna) grown in the quick soil infiltration device 3. During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In a preferred embodiment, rhamnolipid or (poly)aspartic acid or a combination thereof, preferably the combination of rhamnolipid and aspartic acid, is added during the growth process of wetland plants 6, to promote the enrichment of heavy metals in plants, so that the concentration of heavy metals in the plant could be as high as possible. Rhamnolipid and (poly)aspartic acid have good biocompatibility and biodegradability. As water-soluble biosurfactant, rhamnolipid can promote the dissolution of heavy metals adsorbed by soil, etc. through emulsification and solubilization, which is beneficial to plant absorption. (Poly)aspartic acid can chelate and activate heavy metal ions, thus can dissolve the heavy metals adsorbed by soil and so on, and at the same time, it also can effectively promote plant growth, which is different from other chelating agents. By using rhamnolipid and (poly)aspartic acid mixed in a set ratio, plants can effectively enrich heavy metals.

Preferably, the concentration of rhamnolipid in wastewater to be treated is 1-20 mg/L, and the concentration of (poly)aspartic acid in wastewater to be treated is 1-25 mg/L.

In a preferred embodiment of the present invention, the second layer of filler 14 is laid at 500-1000 cm, and the second layer of filler 14 is a mixed filler of soil, natural zeolite and limestone, with the mixing ratio of 1:(2-3):(0.5-1), and preferably 1:2:0.5.

Zeolite is a water-containing porous aluminosilicate, and its crystal is mainly composed of (SiO) tetrahedron. The overall framework of the zeolite molecule is formed by $Al^{3+}$ and $Si^{4+}$ as framework ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Its adsorption of ammonia nitrogen and the adsorption and fixation of heavy metals have greater advantage than other ore raw materials.

Limestone also has more pore structures, so it can effectively adsorb heavy metals. At the same time, the acidity and alkalinity of water can be effectively regulated by limestone, and it play an important role in the growth of plants in the upper filler and the reproduction of microorganisms in water (phosphorus-accumulating bacteria multiply at the pH value of 5-9, and nitrifying bacteria and denitrifying bacteria multiply at the pH value of 6.0-8.5). Meanwhile, limestone can strongly absorb fluoride ions, which effectively reducing the content of fluorine in water.

The soil also provides support for wetland plants 6 in the quick soil infiltration device. At the same time, studies have shown that due to the presence of clay minerals, oxides and soil organic matters in the soil, the soil has a tendency to enrich heavy metals, making its ability to adsorb heavy metal ions not to be underestimated.

After a lot of experimental research, the mixing ratio of the soil, natural zeolite and limestone in the second layer of filler 14 is 1:(2-3):(0.5-1), within this range, the adsorption and fixation of most heavy metals and the adjustment of the pH value of water can be realized. If the proportion of soil increases, the adsorption capacity of heavy metals decreases due to the weaker adsorption effect of soil to heavy metals than those of natural zeolite and limestone; on the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly; on the contrary, the pH value of water cannot be adjusted quickly and effectively, thereby affecting the functional activities of microorganisms.

In a further preferred embodiment, the particle size of the filler in the second layer of filler 14 is 0.08-0.1 cm, which is equal to or lower than that of the functional biochar in the first layer of filler 13, and is equal to or higher than the particle size in the third layer of filler 15. This particle size range is chosen under considering the coordination of gas circulation and total metal adsorption. When the particle size is less than 0.08 cm, although the adsorption of heavy metals is promoted, it is not beneficial to the phosphorus accumulation of the phosphorus-accumulating bacteria placed in the third layer of filler 15 due to increased packing density and poor air circulation. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler 15 is laid at 1000-1500 cm, and the third layer of filler 15 is a mixed filler of fly ash molecular sieve, Flory diatomaceous earth and biochar with the mixing ratio of 1:(3-4):(1-1.5), and preferably 1:3:1.

In the present invention, three kinds of porous fillers, namely fly ash molecular sieve, Flory diatomaceous earth and biochar are used to adsorb heavy metals in the deep layer of the quick soil infiltration device. The common feature of the three is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms.

Since the fly ash molecular sieve, Flory diatomaceous earth and biochar have different adsorption advantages for different heavy metals, the mixing ratio of fly ash molecular sieve, Flory diatomaceous earth and biochar is 1:(3-4):(1-1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of the above three fillers, within this small particle size range, it is beneficial to the adsorption of heavy metal ions and the biofilm formation of microorganisms.

In a preferred embodiment, phosphorus-accumulating bacteria is added in the third layer of filler 15 to reduce the phosphorus content of wastewater to be purified. Said phosphorus-accumulating bacteria are selected from one or more of *Acinetobacter, Aeromonas* and *Pseudomonas*, and preferably *Pseudomona alcaligenes*.

Under aerobic conditions, free oxygen is used as the electron acceptor by phosphorus-accumulating bacteria to oxidize β-hydroxy butyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulating in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of anaerobic phosphorus releasing, thus the phosphorus content of wastewater can be effectively controlled by inputting the phosphorus-accumulating bacteria.

In a preferred embodiment of the present invention, the fourth layer of filler 16 is laid at 1500-2000 cm, the fourth layer of filler 16 is a mixed filler of pebbles and biochar with the mixing weight ratio of 1:(1-2), and preferably 1:1. Pebbles also have the ability to adsorb heavy metals, and are cooperated with biochar to synergistically adsorb heavy metals.

In a further preferred embodiment, the particle size of the filler in the fourth layer of filler 16 is 0.30-0.50 cm. Larger gaps will be formed between the fillers due to their larger particle size, which facilitates the circulation of the introduced microorganisms. Because the particle size of the filler in the third layer of filler 15 is relatively small, the microorganisms are restricted to enter the fourth layer of filler 16 to a certain extent. If the particle size of the filler in the fourth layer of filler 16 is also reduced, the phosphorus-accumulating bacteria cannot effectively travel to and from the third and fourth layers of filler, which is not beneficial to the process of phosphorus-accumulating and -releasing.

In a further preferred embodiment, the fourth layer of filler 16 is an anoxic or anaerobic environment, and anaerobic denitrifying bacteria, preferably heterotrophic anaerobic denitrifying bacteria, are added to the fourth layer of filler 16. $NO_3^-$ can be gradually converted to $NO_2^-$, NO, $N_2O$ and $N_2$ by the denitrifying bacteria, and gets out of the water system, thereby achieving the purpose of denitrification. Although certain nitrifying bacteria and denitrifying bacteria are present in wastewater, some denitrifying bacteria are added in wastewater in present invention to further improve the denitrification efficiency.

In a further preferred embodiment, phosphorus-accumulating bacteria is added to the fourth layer of filler 16. Phosphorus is released by the phosphorus-accumulating bacteria under anaerobic conditions, and the phosphorus releasing under this condition will promote better phosphorus accumulation under aerobic conditions in the third layer of filler.

Denitrifying bacteria and phosphorus-accumulating bacteria are added the in the quick soil infiltration device 3, or the denitrifying bacteria, nitrifying bacteria and phosphorus-accumulating bacteria are added in the $A^2/O$ tank 1, or bacterial with denitrifying function is added in the nano-aeration tank 2, and the denitrification and dephosphorization are together completed in the quick soil infiltration device 3, thereby the contents of nitrogen and phosphorus in wastewater are further effectively reduced, which is beneficial to reach the level of irrigation.

In order to achieve and maintain the anaerobic or anaerobic environment in the fourth layer of filler, a polar polymer film, such as polyaniline film, is filled between the third layer of filler 15 and the fourth layer of filler 16. The polar polymer polyaniline film has unique functions of water permeability and air impermeability. Therefore, water and microorganisms are allowed to circulate between the third layer of filler 15 and the fourth layer of filler 16, while the upper layer of oxygen-containing gas is prevented from entering the fourth layer of filler 16, thereby the life activities of anaerobic denitrifying bacteria and phosphorus-accumulating bacteria in this area can be ensured.

Appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only part of the fertilizer applied to the soil each year is absorbed by the crops of the season, and the rest is fixed by the soil to form large amount of acidic salt deposits, causing soil compaction. Wastewater, especially domestic sewage, may be rich in nitrogen and phosphorus, and both exist in the form of organic phosphorus and organic nitrogen, or inorganic phosphorus and inorganic nitrogen. Organic phosphorus and organic nitrogen are decomposed into inorganic phosphorus, inorganic nitrogen and short carbon chains in the $A^2/O$ tank 1 and the quick soil infiltration device 3. The formed inorganic phosphorus and inorganic nitrogen mostly exist in water in the form of acid radical ions. Once the contents of nitrogen and phosphorus exceed the plant's requirements, the soil condition will definitely be affected, and acidic salt deposition and soil compaction will also occur. Therefore, after extensive research, the aerobic zone (the first, second and third layers of filler zone) and anaerobic zone (the fourth layer of filler zone) are set up in the quick soil infiltration device 3, and phosphorus-accumulating bacteria and denitrifying bacteria are add, thereby effectively solving the problem of excessive nitrogen and phosphorus.

The thicknesses of the first layer of filler 13, the second layer of filler 14, the third layer of filler 15 and the fourth layer of filler 16 are all 500 cm, and the total thickness of the fillers is 2000 cm; and said thickness is the most preferable to effectively implement the function of each filler layer. The thickness of the first layer of filler 13 is from 100 to 700 cm, the thickness of the second layer of filler 14 is from 300 to 700 cm, the thickness of the third layer of filler 15 is from 200 to 600 cm, and the thickness of the fourth layer of filler 16 is from 100 to 600 cm.

In the present invention, the quick soil infiltration device 3 is equipped with an inlet pipe and an outlet pipe on both sides along its length, and each inlet pipe and outlet pipe are equipped with control valves. Wastewater is fed into the first layer of filler 13 through the inlet pipe, and water from the fourth layer of filler 16 is collected by the outlet pipe. When valves of the inlet pipe and the outlet pipe valves are simultaneously opened, the quick soil infiltration device is in a vertical downflow operation mode. The contact area of wastewater and air is greatly increased in the vertical downflow operation mode, which is beneficial to the transmission of oxygen and the purification effect of nitrogen and phosphorus is improved. Moreover, wastewater flows vertically from the bottom to the bottom of the filler bed, and during the flow process from top to bottom, wastewater passes through different media layers, thereby achieving purification of heavy metals and suspended solids.

Another object of the present invention is to provide the method for preventing and controlling pollutants in the reuse of reclaimed water in agricultural activity areas with extreme water shortage, so as to effectively control the content of pollutants in wastewater introduced into the farmland by the device described above. The method includes: providing the $A^2/O$ tank 1, the nano-aeration tank 2 and the quick soil infiltration device 3 connected in sequence;

feeding wastewater to be treated into the $A^2/O$ tank 1, sequentially treating the wastewater in anaerobic, anoxic and aerobic environment, and then transporting the supernatant of the treated wastewater (the supernatant after treatment in aerobic treatment) into the nano-aeration tank 2;

treating the supernatant from the $A^2/O$ tank 1 in aerobic environment in the nano-aeration tank 2, such as organic matter degradation, suspended matter sedimentation, dephosphorization and denitrification, and then transporting the treated supernatant to the quick soil infiltration device 3;

feeding the supernatant of the wastewater treated by the nano-aeration tank 2 into the quick soil infiltration device 3, and also into one or more layers of fillers laid in the quick soil infiltration device 3 to degrade or remove pollutants, such as organic matter degradation, heavy metal fixation and removal, suspended matter filtration, denitrification and dephosphorization. Treated wastewater is reclaimed water that meets the requirements of water quality for farmland irrigation, which is fed to the farmland for irrigation.

In the present invention, the $A^2/O$ tank 1 includes anaerobic tank 101, anoxic tank 102 and aerobic tank 103 connected in sequence. Phosphorus-accumulating bacteria is added to the anaerobic tank 101, which decomposes phosphorus in the body in the anaerobic tank 101. Denitrifying bacteria is added to the anoxic tank 102 to use organic matters and nitrate for denitrification. In the aerobic tank 103, the dissolved phosphorus in the environment is actively absorbed by the phosphorus-accumulating bacteria and stored in the body in the form of phosphorus. Moreover, nitrobacteria are added in the aerobic tank 103, and ammonia nitrogen is oxidized to nitrite and nitrate, which increases the nitrogen nutrition available to plants and controls the content of total nitrogen in wastewater through subsequent denitrification.

In a preferred embodiment, aquatic plants, such as duckweed and algae, are added to the anaerobic tank 101 of the $A^2/O$ tank 1, which are acidified and digested by anaerobic and anoxic environment in the $A^2/O$ tank 1, and then organic matters after acidification are degraded in the aerobic environment. Under the premise of meeting the standards of organic matter in irrigation water, aquatic plants are acidified and degraded into organic matters with short carbon chains in the $A^2/O$ tank 1 to provide microorganisms in the quick soil infiltration device 3 with a carbon source for reproduction, thereby improving the removal of nitrogen, phosphorus and organic matters with long carbon chains in wastewater.

Preferably, when the COD of the supernatant fed into nano-aeration tank 2 in the $A^2/O$ tank is higher than 200 mg/L, it is considered that the degree of decomposition of duckweed and algae in the $A^2/O$ tank 1 is good, and high levels of organic matter are obtained.

In the present invention, aeration disks 10 are set at the lower part of the aerobic tank 103 of the $A^2/O$ tank 1 and the nano-aeration tank 2, and an oxygen-containing fluid is introduced through the aeration disk 10 into the aerobic tank 103 and the nano-aeration tank 2. Furthermore, the oxygen-containing fluid is nano-bubble water or the aqueous solution containing tiny bubbles with a size of 100-500 nm, and dissolved oxygen amount of 10-25 mg/L.

In a preferred embodiment, the nano-aeration tank 2 is filled with carbon fiber ecological grass.

In the present invention, the quick soil infiltration device 3 is provided with four layers of fillers from top to bottom:

the first layer of filler 13 adsorbs heavy metals and degrades organic matters;

the second layer of filler 14 adsorbs and fixes heavy metals;

the third layer of filler 15 adsorbs heavy metals, and phosphorus-accumulating bacteria is added in this area to reduce the phosphorus content of wastewater to be purified because of the phosphorus-accumulating ability;

the fourth layer of filler 16 adsorbs heavy metals, and phosphorus-accumulating bacteria is allowed to dephosphorize in this area by constructing an anaerobic environment, so its phosphorus-accumulation ability in the third layer of filler 15 is promoted. An anaerobic denitrifying bacteria is added to reduce the nitrogen content of wastewater to be purified.

Specifically, the first layer of filler 13 is a mixed filler of soil and functional biochar. The mixing ratio is 3:(6-8), and preferably 3:7, the particle size of the filler is 0.10-0.30 cm, and the thickness of the filler is from 100 to 700 cm.

The second layer of filler 14 is a mixed filler of soil, natural zeolite and limestone. The mixing ratio is 1:(2-3):(0.5-1), and preferably 1:2:0.5, the particle size of the filler is 0.08-0.1 cm, and the thickness of the filler is from 300 to 700 cm.

The third layer of filler 15 is a mixed filler of fly ash molecular sieve, Flory diatomaceous earth and biochar. The mixing ratio is 1:(3-4):(1-1.5), and preferably 1:3:1, the particle size of the filler is 0.05-0.08 cm, and the thickness of the filler is from 200 to 600 cm.

The fourth layer of filler 16 is a mixed filler of pebbles and biochar. The mixing ratio is 1:(1-2), and preferably 1:1, the particle size of the filler is 0.30-0.50 cm, and the thickness of the filler is from 100 to 600 cm.

In the present invention, the ratio of different materials in each filler layer is based on the weight thereof.

In a preferred embodiment, wetland plants 6 are planted on the quick soil infiltration device 3 (on the first layer of filler), and said wetland plants 6 are barracuda and canna. Preferably, rhamnolipid or (poly)aspartic acid or a combination thereof, preferably the combination of rhamnolipid and aspartic acid, is added into the quick soil infiltration device 3 during the growth process of wetland plants 6, to promote the enrichment of heavy metals in plants, so that the heavy metals in the plant can reach high concentration that the plant can withstand.

In a preferred embodiment, a polar polymer, such as polyaniline film, is filled between the third layer of filler 15 and the fourth layer of filler 16. Phosphorus-accumulating bacteria is added to the third layer of filler 15, and denitrifying bacteria and phosphorus-accumulating bacteria are added to the fourth layer of filler 16.

In the present invention, wetland plants such as barracuda and canna, planted in the quick soil infiltration device 3, has extremely excellent enrichment effect on heavy metals, so can be used to prepare functional biochar, which may be used as a filler for the quick soil infiltration device 3.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After a temperature of 1200° C. is reached in the heating vessel, in which the crushed plant particles are fed, thereafter 1200° C. is maintained for 120 min, and then the temperature is reduced from 1200° C. to 20° C. within 200 min, thereby carbonizing the biomass.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon and the decrease of the adsorption and photocatalytic effects.

During the activation, a microwave of 300-700 W is used to radiate for 20-30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 100-140 rpm with a shaker. The concentration of sodium borohydride solution is 10-30 mmol/L.

The activated carbon is washed with distilled water and dried. After cooling to room temperature, the activated carbon after reduction is filled into a container, sealed, and heated at 180-680° C. in an oven for 10-60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then is reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

Example 1

As shown in FIG. 1, a device for preventing and controlling pollutants in the reuse of reclaimed water in agricultural activity areas with extreme water shortage is provided, and the device is used to control the pollutants in wastewater. An $A^2/O$ tank, a nano-aeration tank and a quick soil infiltration device are provided to connect in sequence. Wastewater to be treated and algae are fed into the $A^2/O$ tank, and then into the anaerobic tank (dissolved oxygen content≤0.2 mg/L), the anoxic tank (dissolved oxygen content is 0.2-0.5 mg/L) and the aerobic tank (dissolved oxygen content is 2-4 mg/L) in sequence. Then the supernatant from the aerobic tank (the COD is higher than 200 mg/L) is transported to the nano-aeration tank for wastewater treatment in the aerobic environment of the nano-aeration tank. Wherein, the amount of dissolved oxygen in the nano-aeration tank is maintained at 4-6 mg/L. Moreover, the microorganisms *Bacillus* sp. (*Bacillus* sp. H2 and *Bacillus* sp. JB4) and CFS-1 carbon fiber ecological grass (from Beijing Jingyang Environmental Engineering Co., Ltd.) are added to the nano-aeration tank. The supernatant of wastewater treated by the nano-aeration tank is transported to the quick soil infiltration device.

There are four layers of fillers in the quick soil infiltration device: the first layer of filler at 0-500 cm is a mixed filler of soil and functional biochar, wherein the mixing ratio is 3:7 and the particle size of the filler is 0.10-0.30 cm, and the wetland plants, barracuda and canna, are planted on it; the second layer of filler at 500-1000 cm is a mixed filler of soil, natural zeolite and limestone, wherein the mixing ratio is 1:2:0.5 and the particle size of the filler is 0.08-0.1 cm; the third layer of filler at 1000-1500 cm is added phosphorus-accumulating bacteria *Pseudomona alcaligenes*, and the third layer of filler is a mixed filler of fly ash molecular sieve (Henan Mingze Environmental Protection Technology Co., Ltd., 13× molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus-accumulating bacteria *Pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polymer polyaniline film (obtained according to "Wang Hui. Electrochemical synthesis of polyaniline film photoelectric properties [J]. Journal of Xi'an Jiaotong University, 1999, (08): 107-108").

Example 2-18

Similar to Example 1, with the differences are shown in Table 1 below.

TABLE 1

| Example number | Differences from Example 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01-0.08 cm |
| Example 5 | The particle size of the filler in first layer is 5-30 mm |
| Example 6 | The second layer of filler is soil and limestone in original proportion |
| Example 7 | The second layer of filler is soil and natural zeolite in original proportion |
| Example 8 | The mixing ratio in the second layer of filler is 1:1:2 |
| Example 9 | The particle size of the filler in second layer is 0.01-0.05 cm |
| Example 10 | The particle size of the filler in second layer is 1-10 mm |
| Example 11 | The third layer of filler is fly ash molecular sieve and biochar in original proportion |
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005-0.03 cm |
| Example 15 | The filler of fourth layer is pebbles |
| Example 16 | The particle size of the filler in fourth layer is 0.001-0.30 cm |
| Example 17 | No phosphorus-accumulating bacteria is fed in the third and the fourth layers of filler |
| Example 18 | No anaerobic denitrifying bacteria is fed in the fourth layer of filler |

Experimental Example

The effects of the pollutant control methods in Examples 1-18 are evaluated by measuring the content of heavy metals, $COD_{Cr}$, total phosphorus, total nitrogen and pH in the water before and after the treatment. The results are shown in Table 2.

The water used for evaluation is collected from Beijing municipal sewage. $Pb(NO_3)_2$, $Zn(NO_3)_2$, $Na_3PO_4$ and $NaNO_3$ are added to water, so that the concentration of Pb in the water is 1.15 mg/L, the concentration of Zn is 5.56 mg/L, and the total content of P is 10.17 mg/L, the total content of N is 27.33 mg/L, the concentration of $COD_{Cr}$ is 224 mg/L, and the pH value is 7.35. Wastewater is fed into the water treatment device for a series of treatments with the inflowing rate of 2.5 L/min and the outflowing rate is 2.5 L/min. The treatment time is 24 h (about 10 h in the $A^2/O$ tank, about 2 h in the nano-aeration tank and about 12 h in the quick soil infiltration device), and the water quality is measured after 24 h.

TABLE 2

| Example | Pb (μg/L) | Zn (mg/L) | $COD_{Cr}$ (mg/L) | Total P (mg/L) | Total N (mg/L) | pH |
|---|---|---|---|---|---|---|
| Example 1 | 66 | 1.31 | 82 | 1.38 | 3.77 | 7.23 |
| Example 2 | 91 | 1.69 | 173 | 1.76 | 3.96 | 7.25 |
| Example 3 | 71 | 1.42 | 95 | 1.52 | 4.13 | 7.27 |
| Example 4 | 41 | 1.24 | 76 | 1.97 | 4.26 | 6.83 |
| Example 5 | 79 | 1.48 | 111 | 1.46 | 3.92 | 7.21 |
| Example 6 | 202 | 2.49 | 89 | 1.55 | 3.65 | 7.33 |
| Example 7 | 24 | 0.31 | 94 | 2.19 | 4.51 | 6.15 |
| Example 8 | 124 | 2.14 | 86 | 1.50 | 3.86 | 7.45 |
| Example 9 | 22 | 0.73 | 97 | 1.99 | 4.33 | 7.26 |
| Example 10 | 75 | 1.60 | 88 | 1.74 | 4.02 | 7.24 |
| Example 11 | 78 | 1.37 | 90 | 2.04 | 4.27 | 7.20 |
| Example 12 | 98 | 1.25 | 80 | 1.72 | 3.93 | 7.34 |
| Example 13 | 85 | 1.43 | 87 | 1.92 | 4.09 | 7.27 |
| Example 14 | 54 | 1.17 | 79 | 1.63 | 3.82 | 7.30 |
| Example 15 | 101 | 1.49 | 84 | 1.66 | 3.92 | 7.24 |
| Example 16 | 94 | 1.32 | 87 | 1.78 | 4.11 | 7.27 |
| Example 17 | 75 | 1.41 | 103 | 2.60 | 4.29 | 7.50 |
| Example 18 | 61 | 1.32 | 108 | 2.12 | 5.21 | 7.34 |

As can be seen from Table 2, the decrease in the proportion of functional biochar in the first layer of filler mainly affects the adsorption of heavy metals and the reduction of COD values. When the size of the filler becomes smaller, it is beneficial to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH in the system is affected by the decrease in the proportion of limestone, and the efficiency of the dephosphorization and the denitrification of microorganisms is reduced, causing higher contents of total nitrogen and total phosphorus in the water. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is beneficial to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms, therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

It can be seen from the results in the examples that by using the device of the present invention to treat wastewater, the high content of Pb is decreased to less than 0.1 mg/L, the high content of Zn is decreased to less than 1.5 mg/L, the $COD_{Cr}$ is decreased to less than 100 mg/L, the total P is decreased to less than 1.5 mg/L, the total N is decreased to less than 5.0 mg/L, and the pH value is maintained at a neutral level, which meet the requirements of "GB5084-2005 National Standards for Farmland Irrigation Water Quality Standards".

In the description of the present invention, it should be noted that the orientation or positional relationship indicated by the terms "over", "under", "inner", "outer", "front" and "rear" is based on the working state of the present invention. and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:

1. A device for preventing and controlling pollutants in the reuse of reclaimed water in agricultural activity areas with extreme water shortage, wherein the device includes an $A^2/O$ tank (1), a nano-aeration tank (2) and a quick soil infiltration device (3) connected in sequence, the $A^2/O$ tank (1) is fed with wastewater to be treated, and the wastewater is treated sequentially in an anaerobic tank (101), an anoxic tank (102) and an aerobic tank (103), thereafter the supernatant of the wastewater treated by the aerobic tank (103) is transported into the nano-aeration tank (2);

wherein an aeration disk (10) is set at the lower parts of the aerobic tank (103) of the $A^2/O$ tank (1) and the nano-aeration tank (2), and an oxygen-containing fluid is introduced through the aeration disk (10) into the aerobic tank (103) and the nano-aeration tank (2);

optionally, the oxygen-containing fluid is nano-bubble water or the aqueous solution containing tiny bubbles with a size of 100-500 nm and dissolved oxygen amount of 10-25 mg/L;

in the nano-aeration tank (2), supernatant from the $A^2/O$ tank (1) is treated in aerobic environment, and the supernatant is transported to the quick soil infiltration device (3);

four layers of fillers are laid in the quick soil infiltration device (3), so that the supernatant is allowed to flow through each layer of the fillers to degrade or remove pollutants;

wherein a first layer of filler (13) is a mixed filler of soil and functional biochar with a mixing weight ratio of 3:(6-8), optionally the particle size of the filler is 0.10-0.30 cm, in which heavy metals are adsorbed and organic matters are degraded;

a second layer of filler (14) is a mixed filler of soil, natural zeolite and limestone with a mixing weight ratio of 1:(2-3):(0.5-1), optionally the particle size of the filler is 0.08-0.1 cm, in which heavy metals are adsorbed and fixed;

a third layer of filler (15) is a mixed filler of fly ash molecular sieve, Flory diatomaceous earth and biochar with a mixing weight ratio of 1:(3-4):(1-1.5), and optionally the particle size of the filler is 0.05-0.08 cm, in which heavy metals are adsorbed, and phosphorus-accumulating bacteria is added in this area to reduce the phosphorus content of wastewater;

a fourth layer of filler (16) is a mixed filler of pebbles and biochar with a mixing weight ratio of 1:(1-2), and optionally the particle size of the filler is 0.30-0.50 cm, in which heavy metals are adsorbed, and phosphorus-accumulating bacteria is allowed to release phosphorus in this area by constructing an anaerobic environment.

2. The device according to claim 1, characterized in that, the anaerobic tank (101) of the $A^2/O$ tank (1) are added with aquatic plants, such as duckweed and algae, which are acidified and digested in the anaerobic and anoxic environment in the $A^2/O$ tank (1), and then organic matters are degraded in aerobic environment;

the anaerobic tank (101) and the anoxic tank (102) of the $A^2/O$ tank (1) are equipped with an agitator (8) to crush aquatic plants;

optionally, the COD of the supernatant in the $A^2/O$ tank (1) is higher than 200 mg/L.

3. The device according to claim 2, characterized in that, microorganisms are added in the nano-aeration tank (2), and said microorganism is *Bacillus* sp.;

the average molecular weight of the organic matters in water from the nano-aeration tank (2) is lower than 308.24 Da.

4. The device according to claim 1, characterized in that, the nano-aeration tank (2) is filled with carbon fiber ecological grass.

5. The device according to claim 1, characterized in that, a polar polymer, optionally polyaniline film, is filled between the third layer of filler (15) and the fourth layer of filler (16), so that anaerobic environment is formed in the area where the fourth layer of filler (16) is located;

anaerobic denitrifying bacteria is added to the fourth layer of filler (16);

phosphorus-accumulating bacteria is added to the fourth layer of filler (16).

6. The device according to claim 5, characterized in that, wetland plants (6), optionally barracuda and canna, are planted on the quick soil infiltration device (3);

rhamnolipid or (poly)aspartic acid or a combination thereof, optionally the combination of rhamnolipid and aspartic acid, is added during the growth process of wetland plants (6).

7. The device according to claim 6, characterized in that, functional biochar in the first layer of filler (13) is prepared from wetland plants (6) planted in the quick soil infiltration device (3), and the method includes the following steps:

step 1, the plants are crushed, and then maintained at 900-1600° C. for 120 min in inert environment, thereafter the temperature is reduced from 1200° C. to 20° C. within 200 min, thereby carbonizing to obtain activated carbon;

step 2, the activated carbon is washed with distilled water until the water is clear after washing, thereafter 30-50 wt. % zinc chloride is added to the washed activated carbon until the liquid level is higher than the activated carbon, then the mixture is stirred, radiated with a microwave of 300-700 W for 20-30 min and soaked at 25° C. overnight, thereby obtaining the activated carbon after activation;

step 3, the activated carbon after activation is dried, and a 10 mmol/L-30 mmol/L solution of sodium borohydride is added dropwise at a low temperature to reduce the metal ions in the activated carbon to a low valence, and then the activated carbon is washed with distilled water and dried, thereby obtaining functional biochar.

8. A method for preventing and controlling pollutants in the reuse of reclaimed water in agricultural activity areas with extreme water shortage, by using the device according to claim 1, wherein the method includes:
   providing the $A^2/O$ tank (1), the nano-aeration tank (2) and the quick soil infiltration device (3) connected in sequence;
   feeding wastewater to be treated into the $A^2/O$ tank (1), sequentially treating the wastewater in anaerobic, anoxic and aerobic environment, and then transporting the supernatant of the treated wastewater into the nano-aeration tank (2);
   treating the supernatant from the $A^2/O$ tank (1) in aerobic environment in the nano-aeration tank (2), and transporting the supernatant to the quick soil infiltration device (3);
   feeding the supernatant of the wastewater treated by the nano-aeration tank (2) into the quick soil infiltration device (3), and also into one or more layers of fillers laid in the quick soil infiltration device (3) to degrade or remove pollutants.

\* \* \* \* \*